2,826,995

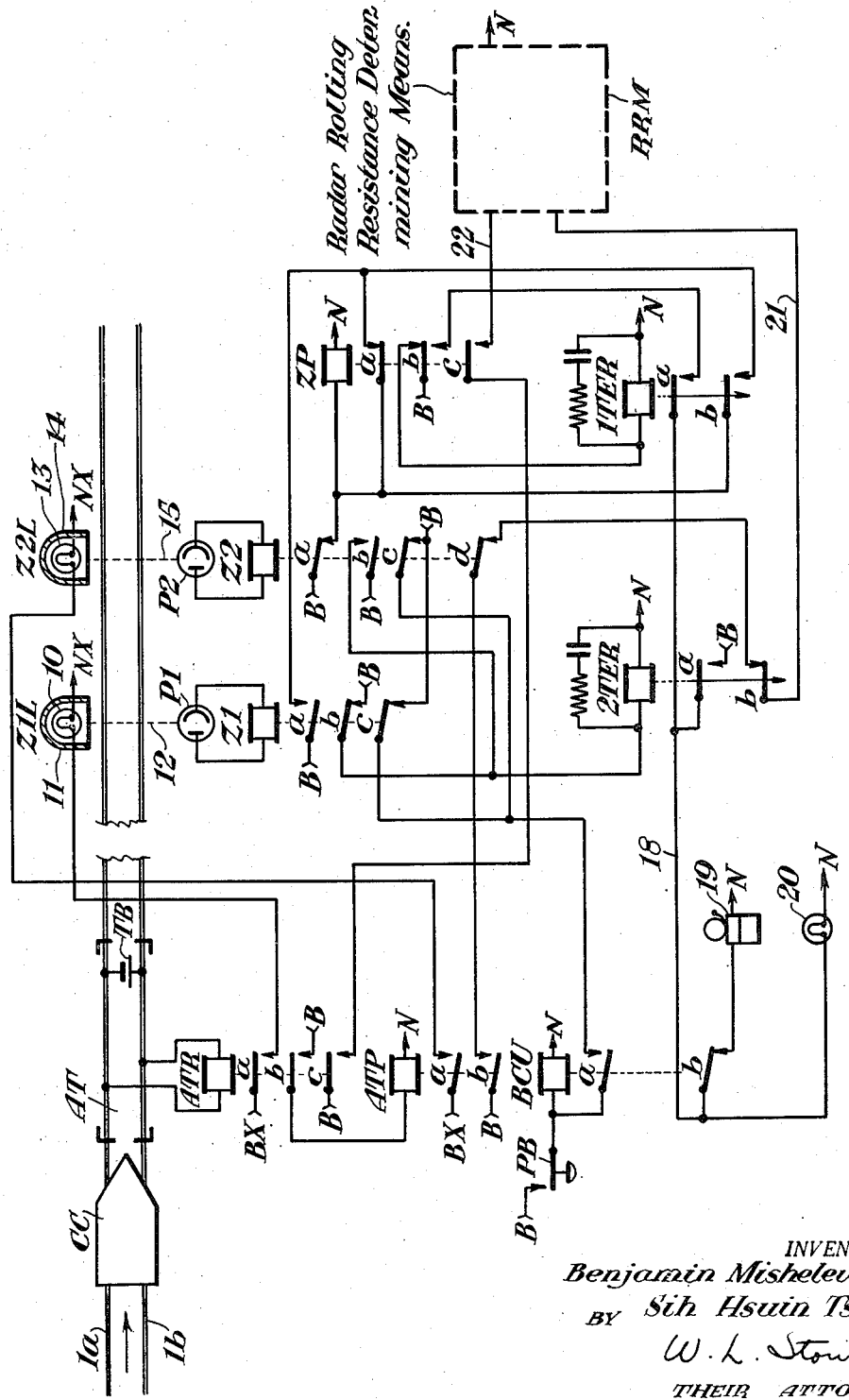

LIGHT RESPONSIVE CONTROL MEANS

Benjamin Mishelevich and Sih Hsuin Tsiang, Pittsburgh, Pa., assignors to Westinghouse Air Brake Company, Wilmerding, Pa., a corporation of Pennsylvania Application March 4, 1955, Serial No. 492,167

10 Claims. (Cl. 104—26)

Our invention relates to light responsive control means, and more particularly to light responsive control means for starting and stopping the measurement of apparatus operable to determine a desired factor pertaining to cars moving over a trackway.

There are many places where it is desirable to measure some factor such as, for example, acceleration and speed of cars moving over a trackway. As an illustration, in railway classification yards of the gravity-type, car cuts which may consist of a single car or a group of cars coupled together move from the crest of a hump track to storage tracks under the action of gravity. It is desirable to measure the rolling resistance of each of the different car cuts, that is, to determine the rate at which the car cuts accelerate. This measurement of rolling resistance is desirable because there is a correct speed at which each car cut should move into its final storage track. To obtain these speeds car retarders are provided which are operable to apply different braking forces to cars moving through the retarder and thereby slow down the car or allow it to speed up so that it leaves the retarder at a desired speed. In other words, the proper control of the retarders of a gravity-type railway classification yard requires that the rolling resistance of each car cut be registered as the cut moves from the crest of the hump tracks toward the storage tracks.

The rolling resistance of any type of car and of railway cars in particular is a variable factor due to the different types and constructions of the cars. Also the rolling resistance of railway cars is varied by weather conditions, a car rolling more freely under high temperatures than under low temperatures. Furthermore, the rolling resistance depends upon the weight of car and its contents, a heavy weight car picking up speed faster than a light weight car.

It is to be seen therefore that in order to properly govern retarders of a gravity-type railway yard it is necessary to register these several factors upon which the rolling resistance of a car cut depends. It has been proposed to determine the rolling resistance of a car cut by a comparison of the speeds of the cut in two different sections of the track. It has been proposed further to determine the rolling resistance of a cut by a measurement of the rolling resistance at every point of a selected portion of the track by radar and thereby obtain measurements from which the average value of the rolling resistance of the cut can be registered. In some installations it is proposed to use radar for measurement of the rolling resistance as determined by the different factors except car weight, the car weight being made a separate and independent control.

In these arrangements the radar operates all the time, and the rolling resistance measurement is registered only when the front end of a car cut is in the measuring portion of track. That is, the rolling resistance measurement is started when the front end of the car cut enters the measuring track section and is stopped when the front end of the cut departs from the measuring section.

At the crest of a hump of a classification yard where the radar measurement is applied, there are car weighing scales and other equipment which make it impractical and expensive to use track circuits and track instruments as means for starting and stopping the rolling resistance measurement.

In view of the foregoing circumstances an object of our invention is the provision of improved light responsive control means.

Another object of our invention is the provisions of improved light responsive equipment for control of apparatus operable to register a given factor pertaining to cars moving along a trackway.

Again an object of our invention is the provision of improved light responsive equipment for starting and stopping the registering of a measurement obtained in response to a car moving into and out of a selected portion of a trackway.

A further object of our invention is the provision of light responsive control equipment including novel means by which inadvertent obstructions of a light beam and failures of the equipment are detected.

Another object of our invention is the provision of novel and improved light responsive control equipment which is restored to normal control automatically after a predetermined time interval when a light beam is obstructed inadvertently.

Again, an object of our invention is the provision of improved light responsive control means for starting and stopping rolling resistance measurement of car cuts in a gravity-type railway classification yard.

Another object of our invention is the provision of light responsive control means using two spaced light beams intercepted in sequence and including novel means to provide an alarm if this sequential operation does not take place within a predetermined time.

Other objects, features and advantages of our invention will become apparent as the specification progresses.

We shall disclose and describe a preferred form of apparatus embodying our invention and shall then point out the novel features thereof in claims.

The accompanying drawing is a diagrammatic view showing a preferred arrangement of apparatus embodying our invention when used with radar car rolling resistance determining means at a gravity-type railway classification yard.

It is to be understood that apparatus embodying our invention is not limited to railway classification yards and this one use of the apparatus serves to illustrate the many places at which the apparatus may be useful.

Briefly, the control apparatus pertains to the starting and stopping of the registering of the measurement of a continuously operating radar car rolling resistance determining means. The control circuit arrangement shown uses two light responsive devices, one to detect the entrance of the front end of a car cut into the measuring section and the other to detect the departure of the front end of the car cut from the section. Means are provided for certain checks to be incorporated into the circuits to assure that this sequence of events occurs properly before the rolling resistance measurement is recorded and thereby prevent the passage of persons or other objects through a light beam from influencing the recording. Time element devices are included in the equipment to automatically restore the operation subsequent to an inadvertent obstruction of a light beam. Also indication means are provided to visually and audibly indicate a failure of the equipment.

Referring to the drawing, the reference characters $1a$ and $1b$ designate the track rails of a stretch of railway track over which car cuts normally move in the direction indicated by an arrow, that is, from left to right as viewed in the drawing. For example, this stretch of track may be the hump track of a gravity-type classification yard. Car cuts are pushed up to the crest of the hump at or near the left-hand end of the drawing and move under the action of gravity from the crest to storage tracks, not shown, at the right-hand end of the drawing. A car cut is shown diagrammatically at CC, which may consist of a single car or a group of cars coupled together. The rolling resistance of this cut is to be determined in order that the car retarders, not shown, provided for the classification yard can be controlled according to the rolling resistance or rolling factor of the cut.

This stretch of track is formed with an insulated track section AT which is provided with a track circuit which includes a track battery TB connected across the rails at one end of the section and a track relay ATR connected across the rails at the other end of the section. The track relay ATR is provided with a direct current repeater relay ATP which is energized by a simple circuit extending from positive terminal B of a suitable source of current such as a battery not shown, over back contact $b$ of relay ATR and winding of relay ATP to the negative terminal N of the current source. Thus when the track section AT is unoccupied, track relay ATR is energized and picked up and repeater relay ATP is deenergized and released, but when the leading pair of wheels and axle of a car cut such as car cut CC enters section AT, track relay ATR is shunted and released to close its back contact $b$ causing relay ATP to be energized and to pick up. It is noted that there is a time interval between the closing of the back contacts of track relay ATR and the closing of front contacts of repeater relay ATP, this time interval being known as the pickup time of relay ATP. With relay ATP of standard construction, this pickup time interval will be relatively short but it can be made a longer interval within limits, by any one of several known constructions for direct current relays.

The track section AT may be formed in the track as best suited and preferably it is located in the approach to the crest of the hump so that when the track circuit is once shunted it remains shunted during the humping of a full train of cars. Again, if the track layout permits, the section AT may be so located and its spaced relationship with the remaining portion of the apparatus made such that track relay ATR and repeater relay ATP are reset for each successive car cut. That is, within limits, the section AT can be located as best suited for the track layout and best suited for the control required.

A portion of this stretch of track to the right of the crest of the hump is made a measuring section or portion for determining the rolling resistance of the car cuts as they move down the hump under the action of gravity. This measuring section is formed by two light responsive devices each having a light unit and a light sensitive relay means. Each unit projects a light beam across the track with the two beams being spaced apart. That is, this measuring section is defined by two spaced light beams projected across the track. These light beams are identified in the drawing by dotted lines 12 and 15, the two beams being projected from light units Z1L and Z2L, respectively. The unit Z1L includes an electric lamp 10 mounted in a housing 11 having an aperture through which the light beam 12 is projected when the lamp 10 is illuminated. Similarly the unit Z2L includes an electric lamp 13 mounted in a housing 14 having an aperture through which light beam 15 is projected when the lamp 13 is illuminated. These light beams 12 and 15 are spaced apart a distance best suited for the installation, the spacing of the light beams not being critical. For example, a spacing of the order of 50 feet is satisfactory, but a shorter or a longer spacing can be used. The light beams are further disposed so that they are above the top of the track rails sufficiently high to be obstructed by the body of a car.

The light sensitive relay means to receive the light beams 12 and 15 may take different forms. For example, they may be photoelectric cells whose conduction depends upon illumination, selenium cells whose resistance depends upon illumination, or photovoltaic cells. As here shown, the light sensitive means are photoelectric cells P1 and P2 each of which includes electrodes enclosed in a suitable envelope, the cells P1 and P2 being mounted to receive the light beams 12 and 15, respectively. That is, each cell has an enclosing tube which is open only toward the cooperating light beam.

Two relays Z1 and Z2 have circuit connections to cells P1 and P2, respectively. The arrangement is such that each relay is energized and picked up when the cooperating cell receives the corresponding light beam and each relay is deenergized and released when the corresponding light beam is obstructed or extinguished.

The lamp 10 of unit Z1L is supplied with current by a simple circuit extending from one terminal BX of a suitable source of alternating current over back contact $a$ of track relay ATR and electric lamp 10 to the other terminal NX of the alternating current source. The lamp 13 of unit Z2L is supplied with current by a circuit including terminal BX of the alternating current source, front contact $a$ of repeater relay ATP, electric lamp 13, and terminal NX.

It follows that lamps 10 and 13 are normally dark but that when the leading leading pair of wheels of a car enters section AT causing relay ATR to be released and relay ATP to be picked up, the two lamps 10 and 13 are supplied with current in succession. The two light beams 12 and 15 are thus projected across the track in succession, the time interval between the projecting of beam 12 and the projecting of beam 15 being the pickup time of relay ATP.

A control relay ZP of the apparatus is provided with a pickup circuit including terminal B, back contact $a$ of relay Z2, winding of relay ZP, and terminal N; and with a stick circuit including terminal B, front contact $a$ of relay Z1, front contact $a$ and the winding of relay ZP, and terminal N. Normally, that is, when section AT is unoccupied and the lamp units are dark, relay ZP is energized by its pickup circuit. Then relay ZP is retained energized by its stick circuit when a car enters section AT because relay Z1 is energized and picked up, closing its front contact $a$ prior to relay Z2 being picked up opening its back contact $a$ due to the time interval between the projection of the two light beams. That is, there is no open circuit time in the circuits for relay ZP during the pickup of relays Z1 and Z2. Relay ZP is further provided with a restoring circuit to be referred to shortly.

Two time element relays 1TER and 2TER are provided. These time element relays may take different forms and as shown each is a direct current relay provided with a timing unit consisting of a resistor and a capacitor in series connected across the winding of the relays as will be apparent from an inspection of the drawing. Thus each relay 1TER and 2TER has a slow release period of a time interval predetermined by the proportion of the parts. For reasons to appear shortly, the slow release time of relays 1TER and 2TER is long enough to bridge the time consumed by a slow moving car cut in moving from light beam 12 to light beam 15, say for example, a time interval of the order of 10 to 15 seconds depending on the spacing of the light beams. The relay 1TER is energized by a circuit including terminal B, front contact $b$ of control relay ZP, winding of relay 1TER and terminal N, and thus it is normally energized and picked up. Relay 2TER is provided with an energizing circuit having two parallel paths, a first one of which extends from terminal B over back contact $b$ of relay Z1 and the winding of relay 2TER to terminal N; and a second path which is completed over front contact *b* of relay Z2. Thus relay 2TER is normally energized and picked up.

This control apparatus thus far described is here used to control rolling resistance determining means which is shown conventionally by a dotted rectangle RRM, since the specific structure of this means is not a part of our present invention and it may take any form suitable to accomplish the measurement desired. As an aid in the understanding of our invention we shall consider that means RRM comprises radar structure mounted and installed so as to measure the acceleration of a car cut moving from the crest of the hump and to register this measurement in terms of rolling resistance or rolling factor when a control circuit is effectively energized. Also it operates to prepare circuits by which the car retarders of the yarn can be controlled according to the measured rolling resistance. The registering of this measurement of the radar structure is started and stopped by control circuits governed by apparatus provided according to our invention. That is to say, the means RRM is a continuously operating radar operable to determine rolling resistance of a car cut traveling this stretch of track but the registering of the measurement is effected only while the front end of the cut is moving from light beam 12 to light beam 15.

Before describing the operation of the apparatus, it is to be pointed out that an indicator bell 19, an indicator lamp 20, a relay BCU, and a pushbutton PB are provided for indicating a failure of the equipment, an inadvertent obstruction of a light beam or a failure of a car cut to intercept the light beams in the proper sequence within a predetermined time interval, these features being explained shortly.

Assuming a train of which the car cut CC is a part is to be switched and the rolling resistance of each cut is to be measured in the operation, the leading pair of wheels of the cut CC on entering track section AT shunts relay ATR, causing current to be supplied to the first light unit Z1L and the repeater relay ATP to be picked up. Relay ATP on picking up causes current to be supplied to the second light unit Z2L. Thus the two light beams 12 and 15 are projected across the track one after the other and the two relays Z1 and Z2 are picked up in succession. The control relay ZP which is normally energized, remains picked up because as explained hereinbefore there is no open circuit time for relay ZP during the pickup of relays Z1 and Z2. Also, the time element relays, which are normally energized, remain energized.

It is to be noted that during the brief interval between relay ATP picking up and the pickup of relay Z2 in response to light beam 15, a current impulse is supplied to radar means RRM by a circuit extending from terminal B over front contact *b* of relay ATP, back contact *d* of relay Z2, front contact *b* of relay 2TER, wire 21, and means RRM to terminal N. This current impulse may be used to prepare the radar for measurement but this circuit may not be required and can be omitted.

When the head end of the car cut CC intercepts light beam 12, relay Z1 is deenergized and released and control relay ZP in turn is deenergized and released. When track section AT is located in the approach to the crest of the hump, the track circuit of section AT remains shunted while a car cut moves down the hump due to section AT being occupied by the following cars of the train being switched and by the pusher locomotive. When track section AT is located close to the measuring section of the track, it would be placed where its track circuit is retained shunted by the rear pairs of wheels of the car cut as the front end of the cut moves through the measuring section. In this last condition, the spacing of the different devices would be relatively short. Release of control relay ZP completes a control circuit for the radar, this circuit extending from terminal B over back contact *c* of track relay ATR, back contact *c* of relay ZP, wire 22, and the radar means RRM to terminal N. Current supplied by this control circuit starts the rolling resistance measurement by the radar.

When the car cut CC advances and its front end obstructs light beam 15, relay Z2 is deenergized and released and control relay ZP is reenergized and picked up by current supplied over its pickup circuit. Relay ZP on picking up to open its back contact *c* interrupts the control circuit for rolling resistance determining means RRM and rolling resistance measurement is stopped. In other words, the measuring operation of radar means RRM is continued only while the front end of the car cut is passing from light beam 12 to light beam 15.

When the car cut clears beam 12, relay Z1 is reenergized and when the beam 15 is cleared by the car cut relay Z2 is reenergized, the control relay ZP being retained picked up during this sequence. The photocells and relays are now ready to function for a following car cut.

As explained hereinbefore, the slow release periods for the time element relays 1TER and 2TER are sufficient to bridge the time consumed by a car cut moving between the light beams. Thus relay 1TER is retained picked up during the period relay ZP is released while the front end of the cut moves from beam 12 to beam 15, and relay 2TER is retained picked up while the rear of the cut moves from beam 12 to beam 15 and relay Z1 is picked up and relay Z2 is released.

In the event that, after a car cut has entered track section AT and before its front end reaches the rolling resistance measuring portion of track, the light beam 12 is inadvertently obstructed by a person walking through the beam, the relay Z1 is released and then shortly picked up. This operation of relay Z1 causes control relay ZP to be released because both its pickup and stick circuits are open. With relay ZP released, control current is applied to measuring means RRM. Also, timing relay 1TER is deenergized, due to the opening of front contact *b* of relay ZP, and releases at the end of its slow release period. When relay 1TER releases, relay ZP is supplied with current by its restoring circuit extending from terminal B over front contact *a* of relay Z1, back contact *b* of relay 1TER, and winding of relay ZP to terminal N. Relay ZP is thus restored to its energized condition ready to function in response to the car cut passing through the light beams.

When relay 1TER is released, indication circuits are completed to indicate this inadvertent obstruction of the light beam 12, this indication circuit being completed from terminal B over back contact *b* of relay ZP, back contact *a* of relay 1TER, wire 18, back contact *b* of relay BCU, to be referred to shortly, and winding of bell 19 to terminal N. Also, branching from wire 18 a path is completed through indicator lamp 20 to terminal N. Thus both an audible indication is provided at bell 19 and a visual indication at lamp 20 of this inadvertent obstruction of the light beam 12.

In the case the beam 15 is the one that is inadvertently obstructed and relay Z2 is released, the time element relay 2TER is deenergized and releases at the end of its slow release period in the event the obstruction of beam 15 continues for this period of time. With relay 2TER released, the circuit for bell 19 and lamp 20 is completed at back contact *a* of relay 2TER, and the obstruction of beam 15 is thus indicated. In the event obstruction of beam 15 is removed promptly or at least prior to the car cut reaching the measuring portions of track, the relay Z2 and in turn relay 2TER are reenergized and the apparatus is ready to control the rolling resistance measuring means.

In the event lamp 10 or photocell P1 fails, relay ZP and in turn relay 1TER are released, and the indicating devices 19 and 20 energized to indicate the failure. Again, in the event lamp 13 or photocell P2 fails, relay 2TER is released to complete the circuit of bell 19 and lamp 20 to provide an indication of the failure.

The bell 19 can be silenced when a failure occurs by operation of the pushbutton PB which, when closed, completes a simple pickup circuit for relay BCU. Relay BCU, on picking up closing its front contact a, establishes a stick circuit for the relay, this circuit being completed at back contacts c in multiple of relays Z1 and Z2.

In the event a car cut stops or greatly slows down and the sequential operation of obstructing beam 12 and then beam 15 does not take place within the predetermined time interval set by the slow release period of relays 1TER and 2TER, one or both of these relays are released depending upon the position of the car cut. The release of relay 1TER or relay 2TER completes the circuit for bell 19 and lamp 20 to indicate this failure of the car cut to properly move through the measuring section.

It is clear from the foregoing description that control apparatus provided according to our invention is simple and inexpensive. It can be adapted to suit almost any arrangement of trackway and style of cars. It is flexible in the spacing of the different elements. The control and time element relays are normally energized. The failure and/or inadvertent obstruction of the light beams are detected and suitable indications established. The control is automatically restored after a light is inadvertently obstructed. A failure of a car to move over the track in the usual manner and sequentially obstruct the light beams within a predetermined time interval is detected and indicated.

Although we have herein shown and described but one form of light responsive control means embodying our invention, it is to be understood that various changes and modifications may be made therein within the scope of the appended claims without departing from the spirit and scope of our invention.

Having thus described our invention, what we claim is:

1. In combination with a stretch of trackway over which cars normally move in a given direction, a first and a second light responsive device mounted along the stretch to be passed by a car in the order named, each said device including a light unit and a light sensitive relay means, each said light unit being effective when illuminated to project a light beam across the trackway for obstruction by a car, each light sensitive relay means receiving the light beam of the corresponding unit and having a relay which is picked up or released according as the beam is or is not received, a control relay having a pickup circuit including a released position contact of the relay of said second device and a stick circuit including a picked-up position contact of the relay of said first device, trackway circuit means in the approach to said devices and including a first and a second normally open contact which are closed in the order named a given time interval apart in response to a car on the trackway, a first and a second lighting circuit including said first and second contacts respectively of said trackway circuit means and having connections to the light units of said first and second devices respectively, for the light units to project their light beams successively when a car approaches the device, whereby said control relay is normally energized, is retained energized when a car approaches the devices, is deenergized when the car obstructs the beam of the first device and is reenergized when the car obstructs the beam of the second device, and a control circuit including a contact of said control relay.

2. In combination with a stretch of trackway over which cars normally move in a given direction, a first and a second light responsive device mounted along the stretch to be passed by a car in the order named, each said device including a light unit and a light sensitive relay means, each said light unit being effective when illuminated to project a light beam across the trackway for obstruction by a car, each light sensitive relay means receiving the light beam of the corresponding unit and having a relay which is picked up or released according as the beam is or is not received, a control relay having a pickup circuit including a released position contact of the relay of said second device and a stick circuit including a picked-up position contact of the relay of said first device, trackway circuit means in the approach to said devices and including a first and a second normally open contact which are closed in the order named a given time interval apart in response to a car on the trackway, a first and a second lighting circuit including said first and second contacts respectively of said trackway circuit means and having connections to the light units of said first and second devices respectively, for the light units to project their light beams successively when a car approaches the devices, whereby said control relay is normally energized, is retained energized when a car approaches the devices, is deenergized when the car obstructs the beam of the first device and is reenergized when the car obstructs the beam of the second device, a slow release relay having an energizing circuit including an energized position contact of said control relay, an alarm circuit including in series deenergized position contacts of said control and slow release relays, and a control circuit including a contact of said control relay.

3. In combination with a stretch of trackway over which cars normally move in a given direction, a first and a second light responsive device mounted along the stretch to be passed by a car in the order named, each said device including a light unit and a light sensitive relay means, each said light unit being effective when illuminated to project a light beam across the trackway to be obstructed by a car, each light sensitive relay means receiving the light beam of the corresponding unit and having a relay which is picked up or released according as the beam is or is not received, a control relay having a pickup circuit including a released position contact of the relay of said second device and a stick circuit including a picked-up position contact of the relay of said first device, trackway circuit means in the approach to said devices and including a first and a second normally open contact which are closed in the order named a given time interval apart in response to a car on the trackway, a first and a second lighting circuit including said first and second contacts respectively of said trackway circuit means and having connections to the light units of said first and second devices respectively for the light units to project their light beams successively when a car approaches the devices, whereby said control relay is normally energized, is retained energized when a car approaches the devices, is deenergized when the car obstructs the beam of the first device and is reenergized when the car obstructs the beam of the second device, a slow release relay having an energizing circuit including an energized position contact of said control relay, a restoring circuit having connections to said control relay and including a current source and a deenergized position contact of said slow release relay to at times reenergize said control relay.

4. In combination with a stretch of trackway over which cars normally move in a given direction, a first and a second light responsive device mounted along the stretch to be passed by a car in the order named, each said device including a light unit and a light sensitive relay means, each said light unit being effective when illuminated to project a light beam across the trackway for obstruction by a car, each light sensitive relay means receiving the light beam of the corresponding unit and having a relay which is picked up or released according as the beam is or is not received, a control relay having a pickup circuit including a released position contact of the relay of said second device and a stick circuit including a picked-up position contact of the relay of said first device, trackway circuit means in the approach to said device and including a first and a second normally open contact which are closed in the order named a given time interval apart in response to a car on the trackway, a first and a second lighting circuit including said first and second contacts respectively of said trackway circuit means and having connections to the light units of said first and second devices respectively to illuminate said light units successively when a car approaches the devices, whereby said control relay is normally energized, is retained energized when a car approaches the devices, is deenergized when the car obstructs the beam of the first device and is reenergized when the car obstructs the beam of the second device, a first and a second slow release relay, a first energizing circuit including a front contact of said control relay with connections to said first slow release relay for energizing that relay, a second energizing circuit including a back contact of the relay of said first device and a front contact of the relay for said second device in multiple with connections to said second slow release relay for energizing that relay, a first alarm circuit including in series back contacts of said control relay and said first slow release relay and an alarm device, and a second alarm circuit including a back contact of said second slow release relay and an alarm device.

5. In combination with a stretch of trackway over which cars normally move in a given direction, a first and a second light responsive device mounted along the stretch to be passed by a car in the order named, each said device including a light unit and a light sensitive relay means, each said light unit being effective when illuminated to project a light beam across the trackway for obstruction by a car, each light sensitive relay means receiving the light beam of the corresponding unit and having a relay which is picked up or released according as the beam is or is not received, a control relay having a pickup circuit including a released position contact of the relay of said second device and a stick circuit including a picked-up position contact of the relay of said first device, trackway circuit means in the approach to said devices and including a first and a second normally open contact which are closed in the order named a given time interval apart in response to a car on the trackway, a first and a second lighting circuit including said first and second contacts respectively of said trackway circuit means and having connections to the light units of said first and second devices respectively to illuminate said light units successively when a car approaches the devices, whereby said control relay is normally energized, is retained energized when a car approaches the devices, is deenergized when the car obstructs the beam of the first device and is reenergized when the car obstructs the beam of the second device, a first and a second slow release relay, a first energizing circuit including a front contact of said control relay with connections to said first slow release relay for energizing that relay, a second energizing circuit including a back contact of the relay of said first device and a front contact of the relay of said second device in multiple with connections to said second slow release relay for energizing that relay, an audible indicator, a visual indicator, an alarm circuit having a first path including in series a back contact of each of said control relay and said first slow release relay and a second path including a back contact of said second slow release relay, said alarm circuit having connections to said audible and visual indicators in multiple, and circuit means including a manually operable push button and a contact in the connections of said alarm circuit to said audible indicator to at times silence that indicator.

6. In a gravity-type railway classification yard having a hump track down which car cuts move under the action of gravity and provided with a continuously operating radar means operable to determine the rolling resistance of a car cut moving on the hump track, the combination comprising, a first and a second light responsive device mounted along the hump track spaced apart to be passed in the order named by a car, each said device having a light unit and a light sensitive means, each said unit operable to project a light beam across the track when supplied with current, each said light sensitive means disposed to receive the light beam of the associated unit and having a relay which is picked up or released according as the light beam is or is not received, a track circuit formed in the hump track in the approach to said devices and having a track relay which is picked up or released according as the track circuit is not or is occupied by a car, a repeater relay having an energizing circuit including a back contact of said track relay, a first current supply circuit including a back contact of said track relay with connections to said light unit of the first device, a second current supply circuit including a front contact of said repeater relay with connections to said light unit of the second device, a control relay having a pickup circuit including a back contact of the relay of the light sensitive means of said second device and a stick circuit including a front contact of the relay of the light sensitive means of said first device, and a control circuit including in series a back contact of said track relay and a back contact of said control relay with connection to the radar means to start rolling resistance measurement when the front end of a car cut obstructs the light beam of said first device and to stop the measurement when the front end of the car cut obstructs the light beam of said second device.

7. In a gravity-type railway classification yard having a hump track down which car cuts move under the action of gravity and provided with a continuously operating radar means operable to determine the rolling resistance of a car cut moving on the hump track, the combination comprising, a first and a second light responsive device mounted along the hump track spaced apart to be passed in the order named by a car, each said device having a light unit and a light sensitive means, each said unit operable to project a light beam across the track when supplied with current, each said light sensitive means disposed to receive the light beam of the associated unit and having a relay which is picked up or released according as the light beam is or is not received, a track circuit formed in the hump track in the approach to said devices and having a track relay which is picked up or released according as the track circuit is not or is occupied by a car, a repeater relay having an energizing circuit including a back contact of said track relay, a first current supply circuit including a back contact of said track relay with connections to said light unit of the first device, a second current supply circuit including a front contact of said repeater relay with connections to said light unit of the second device, a control relay having a pickup circuit including a back contact of the relay of the light sensitive means of said second device and a stick circuit including a front contact of the relay of the light sensitive means of said first device, a control circuit including in series a back contact of said track relay and a back contact of said control relay with connections to the radar means to start rolling resistance measurement when the front end of a car cut obstructs the light beam of said first device and to stop the measurement when the front end of the car cut obstructs the light beam of said second device, a slow release relay energized over a front contact of said control relay, and a restoring circuit including in series a front contact of the relay of said first light responsive device and a back contact of said slow release relay with connection to said control relay to energize the control relay.

8. In a gravity-type railway classification yard having a hump track down which car cuts move under the action of gravity and provided with a continuously operating radar means operable to determine the rolling resistance of a car cut moving on the hump track, the combination comprising, a first and a second light responsive device mounted along the hump track spaced apart to be passed in the order named by a car, each said device having a light unit and a light sensitive means, each said unit operable to project a light beam across the track when supplied with current, each said light sensitive means disposed to receive the light beam of the associated unit and having a relay which is picked up or released according as the light beam is or is not received, a track circuit formed in the hump track in the approach to said devices and having a track relay which is picked up or released according as the track circuit is not or is occupied by a car, a repeater relay having an energizing circuit including a back contact of said track relay, a first current supply circuit including a back contact of said track relay with connections to said light unit of the first device, a second current supply circuit including a front contact of said repeater relay with connections to said light unit of the second device, a control relay having a pickup circuit including a back contact of the relay of the light sensitive means of said second device and a stick circuit including a front contact of the relay of the light sensitive means of said first device, a control circuit including a back contact of said control relay with connection to the radar means to start rolling resistance measurement when the front end of a car cut obstructs the light beam of said first device and to stop the measurement when the front end of the car cut obstructs the light beam of said second device, a slow release relay energized over a front contact of said control relay, an alarm circuit including a back contact of said control relay and a back contact of said slow release relay and having connections to an electric indicator to energize the indicator.

9. In a gravity-type railway classification yard having a hump track down which car cuts move under the action of gravity and provided with a continuously operating radar means operable to determine the rolling resistance of a car cut moving on the hump track, the combination comprising, a first and a second light responsive device mounted along the hump track spaced apart to be passed in the order named by a car, each said device having a light unit and a light sensitive means, each said unit operable to project a light beam across the track when supplied with current, each said light sensitive means disposed to receive the light beam of the associated unit and having a relay which is picked up or released according as the light beam is or is not received, a track circuit formed in the hump track in the approach to said devices and having a track relay which is picked up or released according as the track circuit is not or is occupied by a car, a repeater relay having an energizing circuit including a back contact of said track relay, a first current supply circuit including a back contact of said track relay with connections to said light unit of the first device, a second current supply circuit including a front contact of said repeater relay with connections to said light unit of the second device, a control relay having a pickup circuit including a back contact of the relay of the light sensitive means of said second device and a stick circuit including a front contact of the relay of the light sensitive means of said first device, a control circuit including a back contact of said control relay with connection to the radar means to start rolling resistance measurement when the front end of a car cut obstructs the light beam of said first device and to stop the measurement when the front end of the car cut obstructs the light beam of said second device, a first and a second slow release relay, said first slow release relay having an energizing circuit including a front contact of said control relay, said second slow release relay having an energizing circuit including a first path completed over a back contact of the relay of said first device and a second path completed over a front contact of the relay of said second device, an electric indicator, and a circuit for energizing said indicator including in multiple, back contacts of said first and second slow release relay.

10. In a gravity-type railway classification yard having a hump track down which car cuts move under the action of gravity and provided with a continuously operating radar means operable to determine the rolling resistance of a car cut moving on the hump track, the combination comprising, a first and a second light responsive device mounted along the hump track spaced apart to be passed in the order named by a car, each said device having a light unit and a light sensitive means, each said unit operable to project a light beam across the track when supplied with current, each said light sensitive means disposed to receive the light beam of the associated unit and having a relay which is picked up or released according as the light beam is or is not received, a track circuit formed in the hump track in the approach to said devices and having a track relay which is picked up or released according as the track circuit is not or is occupied by a car, a repeater relay having an energizing circuit including a back contact of said track relay, a first current supply circuit including a back contact of said track relay with connections to said light unit of the first device, a second current supply circuit including a front contact of said repeater relay with connections to said light unit of the second device, a control relay having a pickup circuit including a back contact of the relay of the light sensitive means of said second device and a stick circuit including a front contact of the relay of the light sensitive means of said first device, a first control circuit including in series a front contact of said repeater relay and a back contact of the relay of said second device with connection to the radar means, and a second control circuit including a back contact of said control relay with connections to said radar means whereby the radar means is energized to register rolling resistance measurement of the car cut.

References Cited in the file of this patent

UNITED STATES PATENTS

| | | |
|---|---|---|
| 1,794,360 | Bossart | Mar. 3, 1931 |
| 1,958,149 | Logan | May 8, 1934 |
| 1,958,631 | Logan | May 15, 1934 |
| 2,361,466 | Fitzsimmons | Oct. 31, 1944 |
| 2,581,552 | O'Hagan et al. | Jan. 8, 1952 |